(12) United States Patent
Jang et al.

(10) Patent No.: US 7,907,327 B2
(45) Date of Patent: Mar. 15, 2011

(54) ELECTROPHORETIC DISPLAY DEVICE AND OPERATING METHOD OF THE SAME

(75) Inventors: Jae Eun Jang, Seoul (KR); Jae Eun Jung, Seoul (KR); Jai Yong Han, Suwon-si (KR); Chang Ho Noh, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 262 days.

(21) Appl. No.: 12/133,135

(22) Filed: Jun. 4, 2008

(65) Prior Publication Data

US 2009/0161200 A1 Jun. 25, 2009

(30) Foreign Application Priority Data

Dec. 20, 2007 (KR) .................. 10-2007-0134112

(51) Int. Cl.
*G02B 26/00* (2006.01)
(52) U.S. Cl. ........................ 359/296; 345/107
(58) Field of Classification Search .................. 359/296; 345/107, 690
See application file for complete search history.

(56) References Cited

U.S. PATENT DOCUMENTS

| | | | |
|---|---|---|---|
| 6,271,823 B1 | 8/2001 | Gordon, II et al. | |
| 6,741,304 B2 * | 5/2004 | Nauta et al. | 349/65 |
| 7,072,095 B2 * | 7/2006 | Liang et al. | 359/296 |
| 7,283,119 B2 * | 10/2007 | Kishi | 345/107 |
| 7,365,732 B2 * | 4/2008 | Matsuda et al. | 345/107 |
| 7,397,597 B2 * | 7/2008 | Verschueren et al. | 359/296 |
| 7,545,557 B2 * | 6/2009 | Iftime et al. | 359/296 |
| 2002/0171619 A1 | 11/2002 | Gordon et al. | |
| 2002/0171620 A1 * | 11/2002 | Gordon et al. | 345/107 |

FOREIGN PATENT DOCUMENTS

| | | |
|---|---|---|
| JP | 2004-020818 | 1/2004 |
| KR | 10-2004-0093059 | 11/2004 |

* cited by examiner

*Primary Examiner* — Timothy J Thompson
(74) *Attorney, Agent, or Firm* — Cantor Colburn LLP

(57) ABSTRACT

An electrophoretic display device with high reliability, high reflectance and improved color characteristics. The electrophorectic display device includes unit cells, each of which includes transmissive particles and a reflective panel. The unit cells are vertically laminated or arranged in parallel. In addition, the electrophorectic display device exhibits excellent visibility and has a simple structure.

19 Claims, 10 Drawing Sheets
(10 of 10 Drawing Sheet(s) Filed in Color)

ELECTROPHORETIC DISPLAY DEVICE AND OPERATING METHOD OF THE SAME

This application claims priority to Korean Patent Application No. 10-2007-134112, filed on Dec. 20, 2007, and all the benefits accruing therefrom under 35 U.S.C. §119, the contents of which in its entirety are herein incorporated by reference.

BACKGROUND OF THE INVENTION

1. Field of the Invention

This invention is directed to an electrophoretic display device and a method for operating the same. More specifically, the electrophoretic display device includes unit cells, each of which includes transmissive particles and a reflective panel, wherein the unit cells are vertically laminated or arranged in parallel, thereby achieving high reliability, high reflectance and improved color characteristics.

2. Description of the Related Art

Electrophoresis is a phenomenon in which charged particles migrate when an electric field is applied to a dispersion of the particles in a fluid. Electrophoretic display devices refer to image display apparatuses based on the electrophoresis which enable repeated writing and erasing of shapes and letters.

FIGS. 1a and 1b are schematic cross-sectional diagrams illustrating the structure and operation of a conventional electrophoretic display device. Referring to FIGS. 1a and 1b, charged white particles 130 and charged black particles 140 are introduced between two panels 110 and 120, each of which has a conductive electrode. The charged particles 130 and 140 migrate to the different panels 110 and 120 under the influence of an applied electric field because they are oppositely charged in polarity. As shown in FIG. 1a, when the white particles 130 are negatively charged and the black particles 140 are positively charged, the black particles 140 are adsorbed to the upper panel 110 to which a negative potential is applied and the white particles 130 are adsorbed to the lower panel 120 to which a positive potential is applied. The black particles 140 completely absorb white light incident from an external source and reflect no light, so that an observer perceives a black color. Conversely, when a positive potential is applied to the upper panel 110, the white particles 130 are adsorbed to the upper panel 110 to completely reflect the incident light (see FIG. 1b), thus allowing the observer to perceive a white color. A color display device can be fabricated in accordance with the same procedure as described above except that colored particles are introduced instead of black particles and white particles.

However, the use of the two types of oppositely charged particles in the conventional display device may cause poor reliability and difficulties in operating the display device. Specifically, the two types of oppositely charged particles are brought into contact with each other due to their electric attraction (see FIG. 2a) and are finally neutralized. The neutralized particles lose their electrostatic properties, and as a result, they do not respond any more to the applied electric field.

The charged particles may be surrounded with insulating films or processed so as not to exchange electrons. In any case, however, since electric attractive forces act between the particles, the two types of particles are brought into contact with each other to form dipoles. Once the dipoles are formed, an electric field for operation must be additionally applied to destroy the dipoles and move the particles, resulting in an increase in operation voltage (see FIG. 2b). Further, since the display device employs a scattering mode for operation, the colored particles are required to play a role in scattering light. It is desirable that the particles be several micrometers in diameter to increase the scattering efficiency of light. The use of large amounts of the large-size particles inevitably leads to an increase in operation voltage and a delay in response time. To the contrary, a decrease in the size of the particles leads to a reduction in the reflectance of the display device.

BRIEF SUMMARY OF THE INVENTION

The present invention has made an effort to solve the above-stated problems and aspects of the present invention provide an electrophoretic display device having unit cells which are vertically laminated or arranged in parallel and a method of operating the same. In addition, the electrophorectic display device exhibits excellent visibility and has a simple structure.

In an exemplary embodiment, the present invention provides an electrophoretic display device including unit cells divided by partitions, each of the unit cells including an upper panel including a transparent substrate and a second electrode formed over an entire surface of the transparent substrate, a lower panel disposed opposite to the upper panel and including a transparent substrate and first electrodes formed at edges of the transparent substrate, a reflective panel positioned under the lower panel, and a plurality of charged transmissive colored particles introduced between the upper and lower panels, wherein the unit cells are vertically laminated or arranged in parallel.

In another exemplary embodiment, the present invention provides a method for operating the electrophoretic display device. The method includes uniformly dispersing the charged transmissive colored particles in the fluid to create a color, and collecting the dispersed transmissive particles on the first electrodes to erase the color.

BRIEF DESCRIPTION OF THE DRAWINGS

The patent or application file contains at least one drawing executed in color. Copies of this patent or patent application publication with color drawings will be provided by the Office upon request and payment of the necessary fee.

The above and other aspects, features and advantages of the present invention will become apparent from the following detailed description when taken in conjunction with the accompanying drawings, in which.

DETAILED DESCRIPTION OF THE INVENTION

Figure 1A:
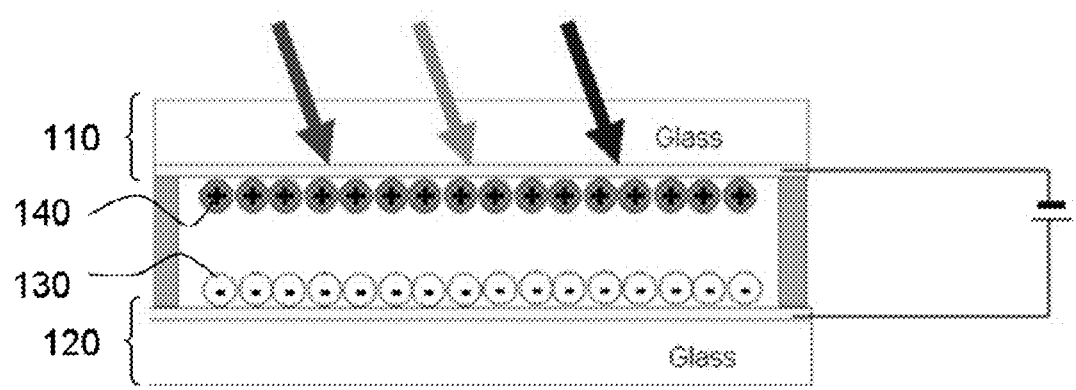
FIGS. 1a and 1b are schematic cross-sectional diagrams of a conventional electrophoretic display device.
Figure 1B:
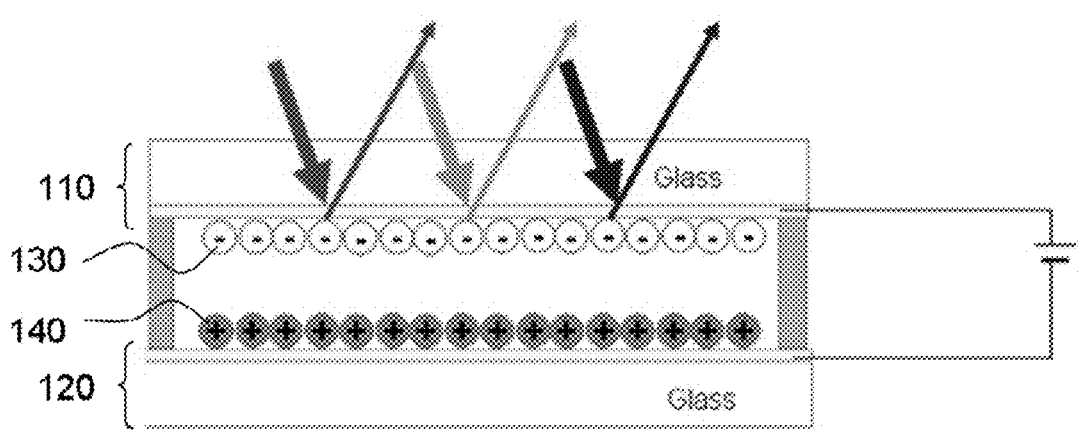
Figure 2A:
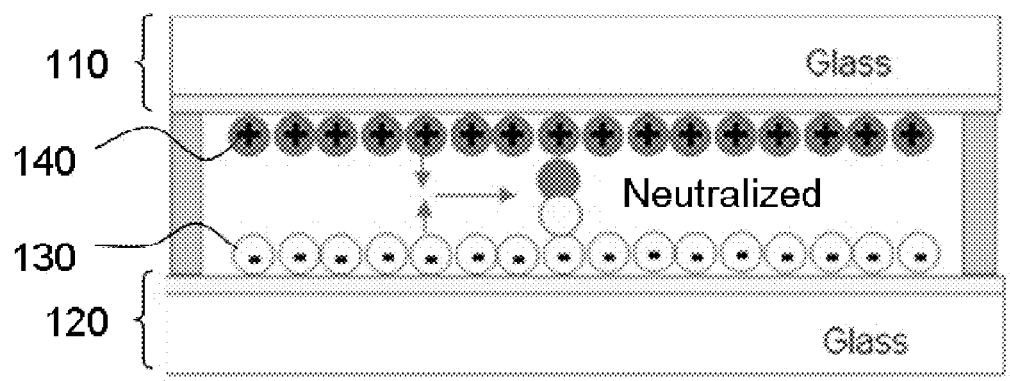
FIGS. 2a and 2b are conceptual diagrams illustrating the problems of a conventional electrophoretic display device.
Figure 2B:
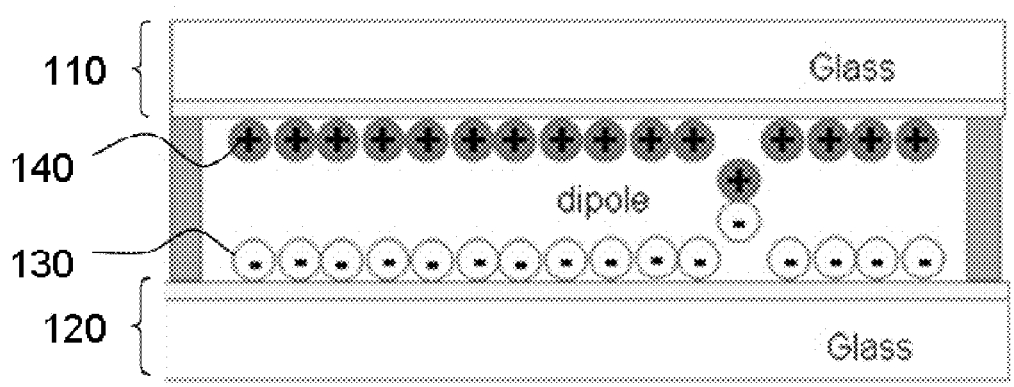

The invention is described more fully hereinafter with reference to the accompanying drawings, in which exemplary embodiments of the invention are shown. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. Hereinafter, exemplary embodiments of the present invention will be described in detail with reference to the accompanying drawings.

Figure 3:
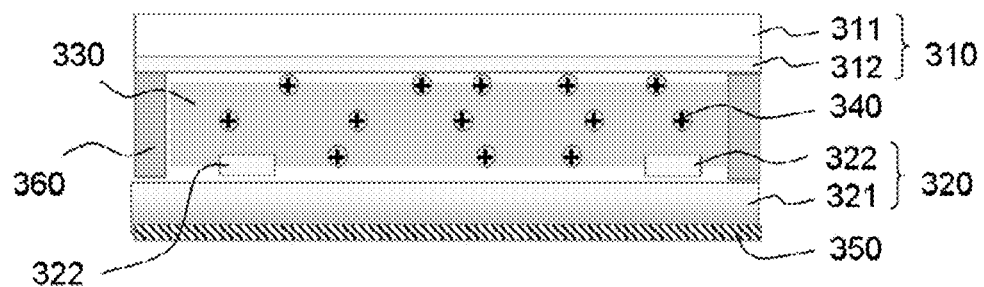
FIG. 3 is an schematic cross-sectional diagram of an exemplary embodiment of an electrophoretic display device according to the present invention.

FIG. 3 is a schematic cross-sectional diagram of an exemplary embodiment of a unit cell of the electrophoretic display device according to the present invention. Referring to FIG. 3, the unit cell includes an upper panel 310 comprising a transparent substrate 311 and a second electrode 312 formed over an entire surface of the transparent substrate 311, a lower panel 320 disposed opposite to the upper panel 310 and comprising a transparent substrate 321 and a plurality of first electrodes 322 formed at edges of the transparent substrate 321, a reflective panel 350 positioned under the lower panel 320, a fluid 330 accommodated between the upper panel 310 and the lower panel 320, transmissive charged particles 340 dispersed in the fluid 330, and partitions 360 separating the unit cell from adjacent cells.

According to an exemplary embodiment, the transmissive charged particles 340 include a same polarity and are electrophoretic particles emitting the same color. Alternatively, according to another exemplary embodiment, the transmissive charged particles 340 may be oppositely charged in polarity and may be electrophoretic particles emitting different colors.

In an exemplary embodiment, the transmissive charged particles 340 of the electrophoretic display device are selected from charged particles of cyan, magenta and yellow emitting materials. In another exemplary embodiment, the transmissive charged particles 340 are selected from the group consisting of charged particles of cyan, magenta, yellow, red, green and blue emitting materials.

According to an exemplary embodiment, the reflective panel 340 is white or black.

Figure 4A:
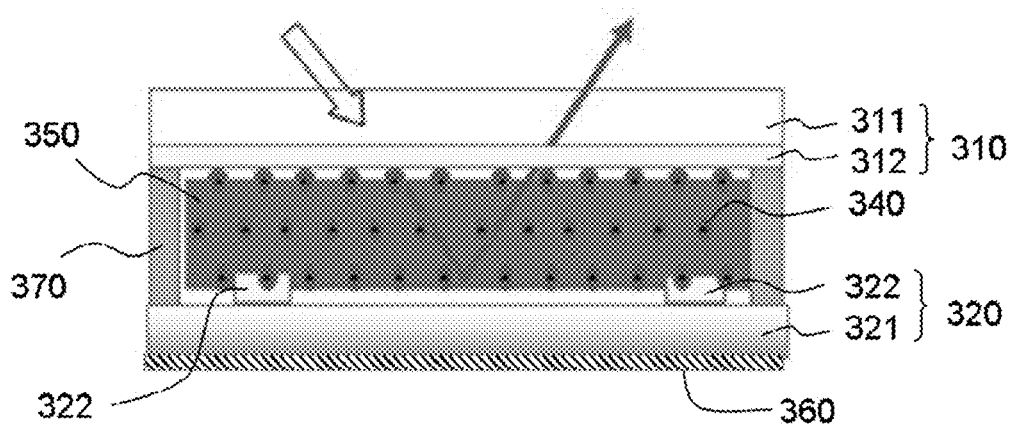
FIGS. 4a through 4c are conceptual diagrams illustrating an exemplary embodiment of the operating method of a one-cell one-color type unit cell of an electrophoretic display device shown in FIG. 3.
Figure 4B:
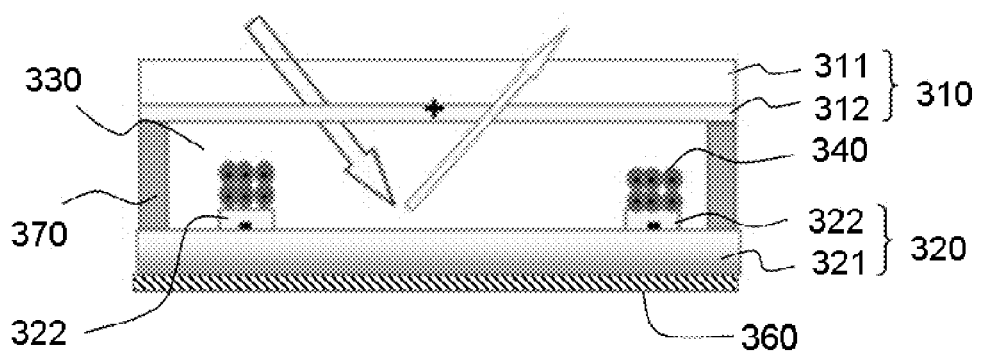
Figure 4C:
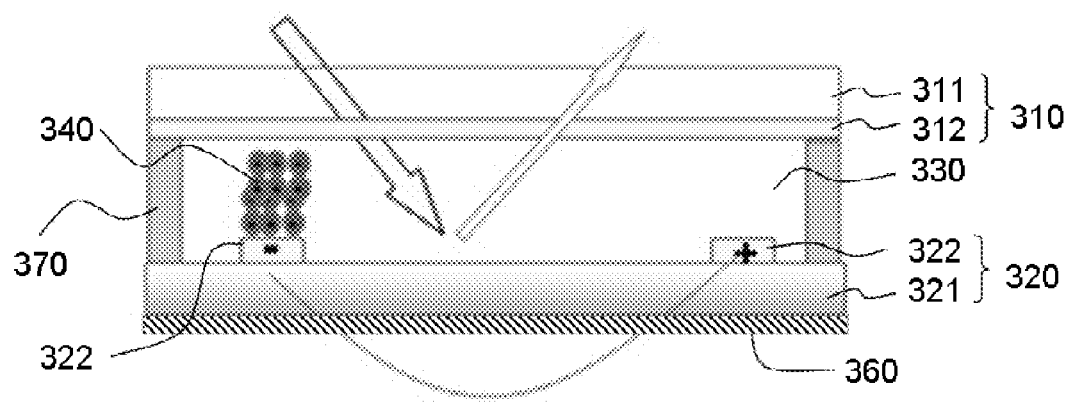

FIGS. 4a through 4c are conceptual diagrams illustrating of an exemplary embodiment of an operating method of a one-cell one-color type unit cell of the electrophoretic display device in which the transmissive charged particles 340 are charged with the same polarity and emit the same color.

When the transmissive charged particles 340 are magenta emitting particles uniformly distributed throughout the cell, as shown in FIG. 4a, the transmissive particles 340 selectively reflect light of red and blue wavelengths only so that an observer perceives a magenta color. When a negative electric field is applied to the first electrodes 322 (see FIG. 4b), the positively charged particles can be easily collected on the first electrodes 322, allowing the cell to produce a white or black color depending on the color characteristics of the reflective panel 350. When a rapid alternating current (AC) or +/− pulsed voltage is applied between the first electrodes 322 or between the first and second electrodes 322 and 312 to redisperse the collected particles, the transmissive charged particles 340 keep on moving between both electrodes so that they can be effectively redispersed over the entire region of the cell (see FIG. 4c).

The use of the particles charged with the same polarity in the one-cell one-color type unit cell can solve the problems associated with the use of particles charged with different polarities. In addition, the additional use of the reflective panel in the unit cell increases the reflection efficiency of the cell, indicating a high reflectance of the display device.

Figure 5A:
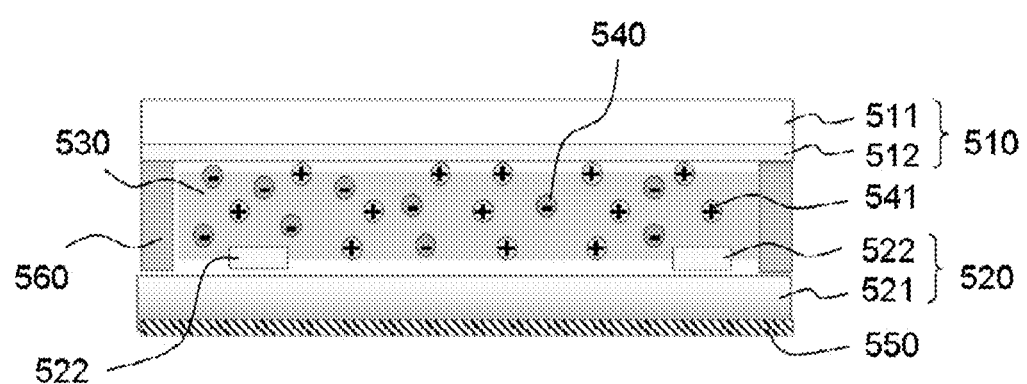
FIGS. 5a through 5c are conceptual diagrams illustrating an exemplary embodiment of the operating method of a one-cell two-color type unit cell of an electrophoretic display device as shown in FIG. 3.
Figure 5B:
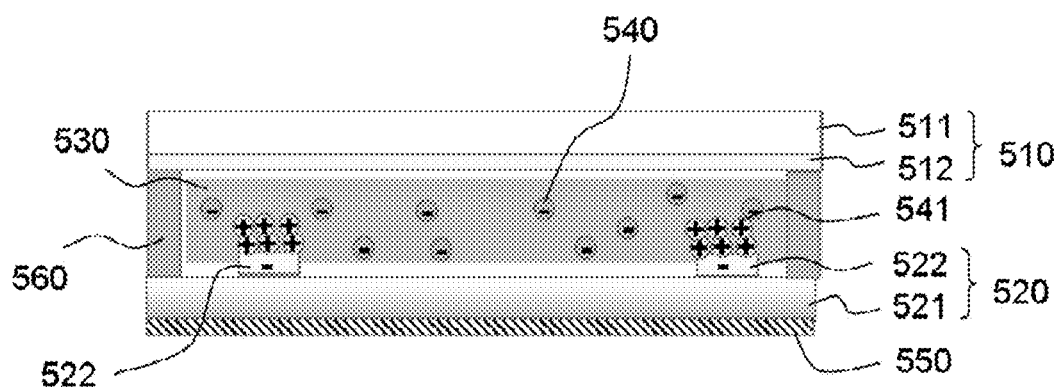
Figure 5C:
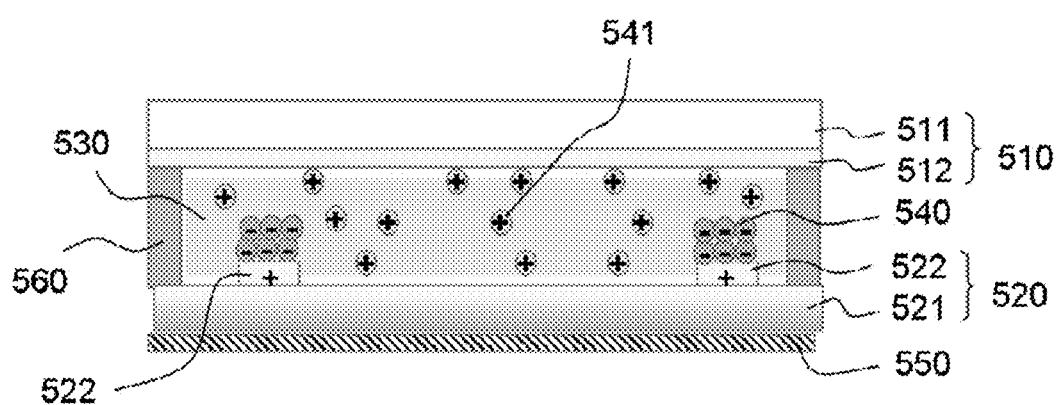

FIGS. 5a through 5c are conceptual diagrams illustrating an exemplary embodiment of the operating method of a one-cell two-color type unit cell of the electrophoretic display device in which transmissive charged particles are charged with different polarities and emit different colors. As shown in FIG. 5a, for example, the unit cell includes an upper panel 510 comprising a transparent substrate 511 and a second electrode 512 formed over an entire surface of the transparent substrate 511, a lower panel 520 disposed opposite to the upper panel 510 and comprising a transparent substrate 521 and a plurality of first electrodes 522 formed at edges of the transparent substrate 521, a reflective panel 550 positioned under the lower panel 520, a fluid 530 accommodated between the upper panel 510 and the lower panel 520, transmissive charged particles 540 dispersed in the fluid 530, and partitions 560 separating the unit cell from adjacent cells.

When cyan particles 540 and yellow particles 541 are charged with different polarities as the transmissive charged particles are uniformly distributed throughout the cell (see FIG. 5a), the transmissive charged particles selectively absorb light of red and blue wavelengths only so that an observer perceives a green color. When a negative electric field is applied to a first electrodes 522 (see FIG. 5b), positively charged yellow particles are easily collected on the first electrodes 522 so that the observer can view a cyan color. An alternating current or a pulsed electric force corresponding to the alternating current is applied between the first electrodes 522 or between the first electrodes 522 and a second electrode 512 to uniformly distribute the two types of charged particles 540 and 541. Thereafter, a positive electric field is applied to the first electrodes 522 (see FIG. 5c) to collect the negatively charged cyan emitting particles 540 on the first electrodes 522 so that the observer perceives a yellow color. In conclusion, the colors of the respective charged particles and mixed colors thereof can be produced from one unit cell.

Figure 6A:
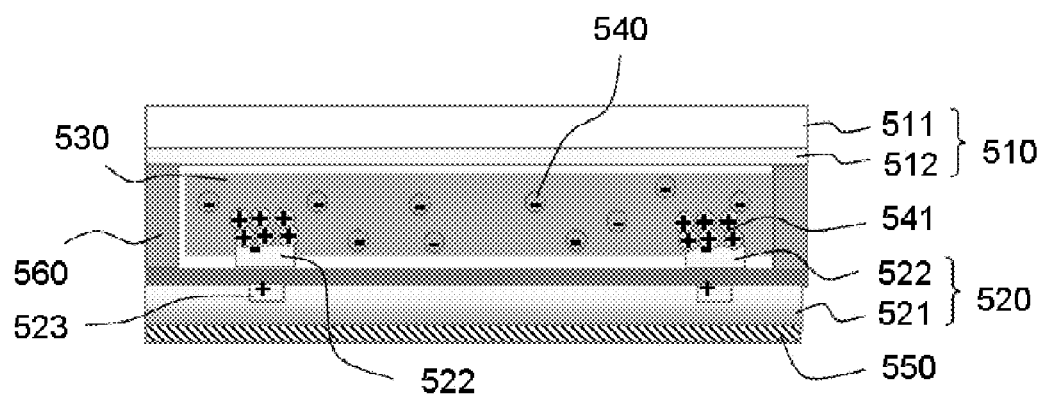
FIGS. 6a and 6b are schematic cross-sectional diagrams of an exemplary embodiment of an improved electrophoretic display device.

According to an exemplary embodiment, as shown in FIG. 6A, the display device further comprises counter electrodes 523 that underlie the respective first electrodes 522 of the unit cell and are smaller in size than the first electrodes 522.

That is, since either negative or positive electric field must be applied to the unit cell of the display device through common electrodes 523 or surrounding cells, the intensity of the electric field is reduced or it may be influenced by external factors.

Figure 6B:
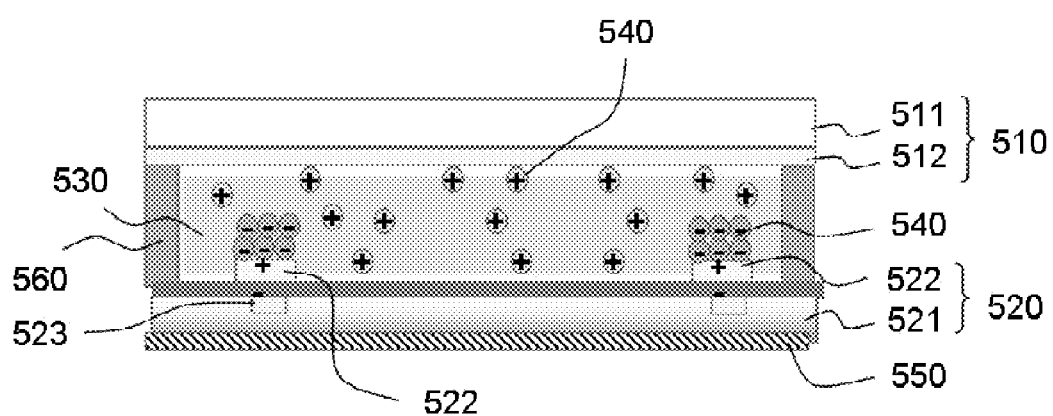

FIGS. 6a and 6b show an exemplary embodiment of an improved structure of the display device according to the present invention. Specifically, the display device further comprises the counter electrodes 523, where an electric field opposite to that of the first electrodes 522 is to be applied, disposed under the respective first electrodes 522. According to the current exemplary embodiment, the size of the counter electrodes 523 be smaller than that of the first electrodes 522. That is, the width of the counter electrodes 523 is at least 10 μm smaller than the width of the first electrodes 522. Due to the presence of the counter electrodes 523, a uniform and strong electric field can be formed throughout the display device. The electric field of the counter electrodes 523 is shielded by the overlying first electrodes 522. This shielding enables effective collection of only one type of the charged particles on the first electrodes 522 without affecting the particles carrying a charge opposite to that of the first electrodes 522.

According to an exemplary embodiment, the unit cells of the display device are transmissive. Accordingly, the display device provides a parallel type color pixel structure, which is mainly employed in conventional display devices, a laminate type structure, or a combination thereof.

Figure 7:
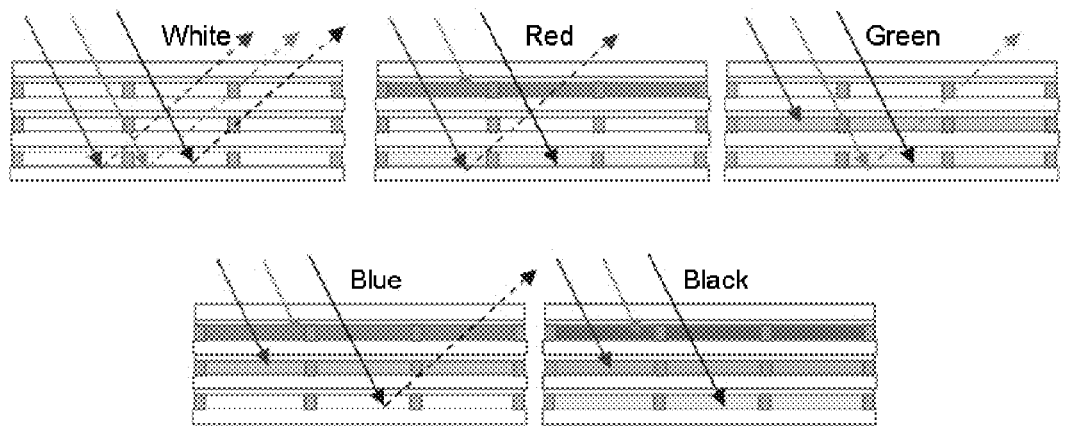
FIG. 7 shows conceptual diagrams illustrating the principle of color representation of conventional laminate type pixel structures.

The best colors can be represented using laminate type cell structures. For example, cyan, magenta and yellow emitting unit cells are vertically laminated (see FIG. 7) to represent the best colors. In this case, since only colors emitted from the laminates can be viewed by an observer, substantially pure colors can be represented. However, the laminates consist of the three unit cells, making the lamination procedure complex and the operation of the cells complicated. A total of six electrodes (each layer including upper and lower electrodes) are laminated, disadvantageously causing a loss of light.

The aforementioned problems can be solved by the use of the transmissive unit cells in the display device to provide a laminate type color pixel structure, a parallel type color pixel structure or a combination thereof, contributing to further improvement in the color characteristics of the display device and the simplification of the structure of the display device.

Figure 8:
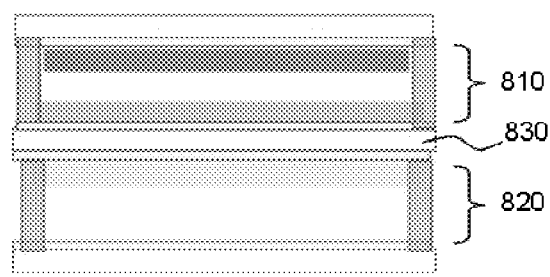
FIG. 8 is a diagram of an exemplary embodiment of a laminate type color pixel structure of an electrophoretic display device.

FIG. 8 shows an exemplary laminate type color pixel structure of the display device.

In the color pixel structure, two unit cells 810 and 820 having a one-cell two-color structure are vertically laminated, and an intermediate panel 830 is interposed therebetween.

White, black, red, green and blue colors can be perfectly produced from the color pixel structure because of the laminated arrangement of the unit cells 810 and 820, each emits two colors. The lamination of the two unit cells can reduce the structural complexity of the display device and the number of electrodes laminated in the display device is decreased to four, which prevents a reduction in transmittance. The intermediate panel 830 of the pixel structure may be made of a different material from the upper and lower panels. For example, the intermediate panel 830 may be a simple insulating film. Two separate panels can be used instead of the intermediate panel 830.

In an exemplary embodiment, one of the two unit cells 810 and 830 laminated in the color pixel structure of the display device may be of a one-cell one-color type to emit only one color.

In an exemplary embodiment, two one-cell two-color unit cells are arranged parallel to each other in the color pixel structure of the display device.

Figure 9A:
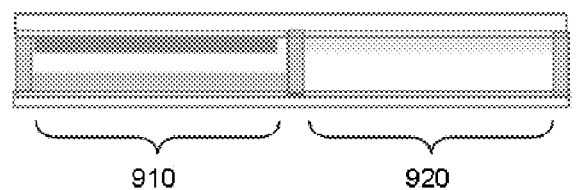
FIGS. 9a and 9b are schematic cross-sectional diagrams of an exemplary embodiment of parallel type color pixels according to the present invention.

FIG. 9a is an exemplary schematic cross-sectional diagram of the parallel type color pixel structure. The parallel type color pixel structure cannot realize perfect pure colors but can reduce the generation of unwanted light to achieve improved visibility of the display device. That is, unwanted light is generated in two cells 910 and 920 of the three cells used in the conventional pixel structure, resulting in deterioration of visibility, whereas the area of the cells 910 and 920 where unwanted light is generated in the parallel type color pixel structure can be reduced from $2/3$ to $1/2$, resulting in markedly improved color characteristics. Furthermore, from the standpoint of processing and structural simplicity, the parallel type pixel structure is advantageous over the conventional pixel structure.

Figure 9B:
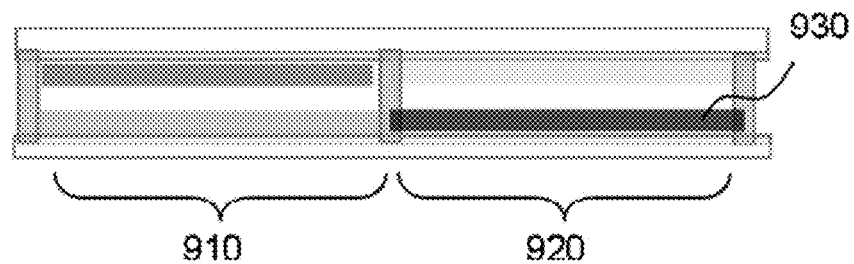

As shown in FIG. 9b, a black emitting material 930 is used to constitute any one type of the four types of colored particles in the parallel type color pixel structure, resulting in an increase in contrast. In an embodiment, one of the two unit cells 910 and 920 may be of a one-cell one color type to emit only one color.

Figure 10A:
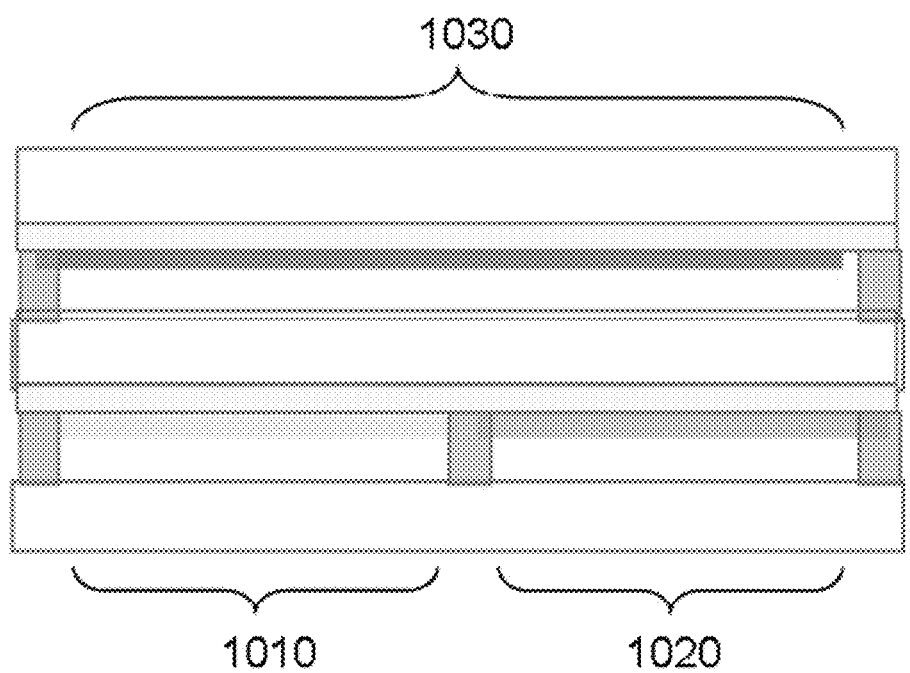
FIGS. 10a through 10c are schematic cross-sectional diagrams of an exemplary embodiment of pixel structures in which one-cell one-color type unit cells are laminated according to the present invention.
Figure 10B:
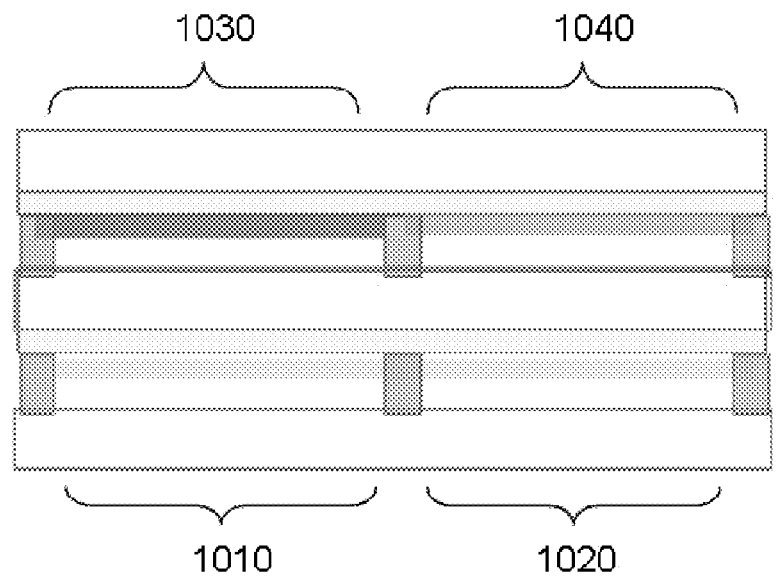
Figure 10C:
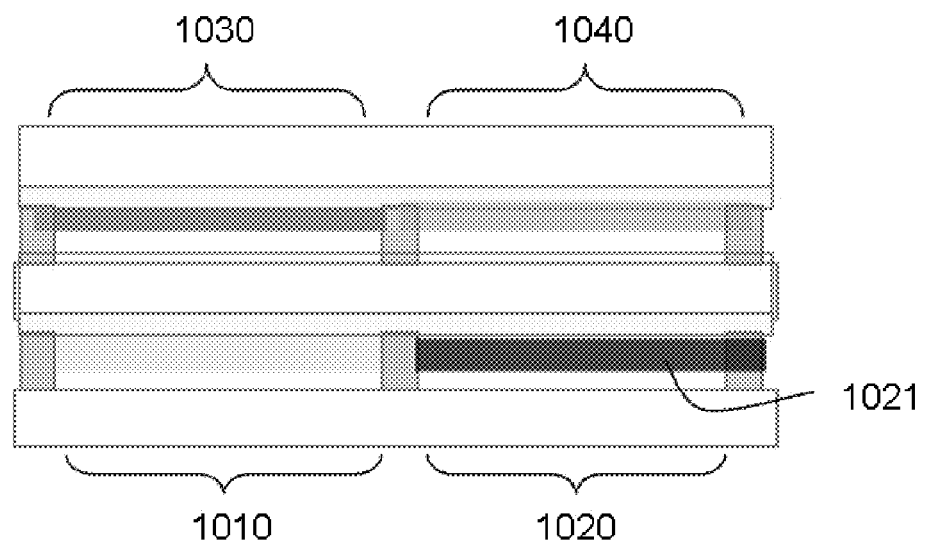

Another exemplary color pixel structure of the display device may have a structure in which two one-cell one-color type unit cells 1010 and 1020 are arranged parallel to each other and one common unit cell 1030 is laminated thereon, as shown in FIG. 10a. FIG. 10b shows another color pixel structure of the display device in which two one-cell one-color type unit cells 1010 and 1020 are arranged parallel to each other and two one-cell one-color type unit cells 1030 and 1040 are laminated on the respective unit cells 1010 and 1020. As shown in FIG. 10c, the unit cell 1020 uses black emitting colored particles 1021 to achieve improved contrast of the display device. The area of the cells where unwanted light is generated in the pixel structures can be reduced from ⅔ to ½, resulting in an improvement in color purity. In addition, the number of the cells for color representation is decreased from three to two to achieve a high resolution. Furthermore, from the standpoint of processing and structural simplicity, the pixel structures are advantageous over the conventional three-layer laminate structure.

Figure 11:
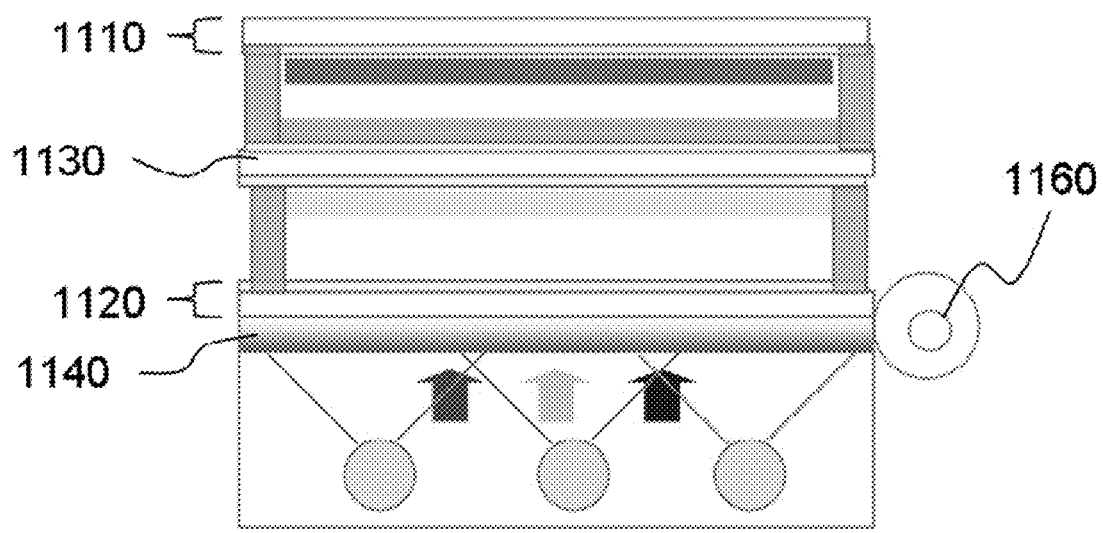
FIG. 11 is a schematic cross-sectional diagram of an exemplary embodiment of a combined transmissive/reflective (transflective) color pixel structure of an electrophoretic display device according to the present invention.
Figure 12:
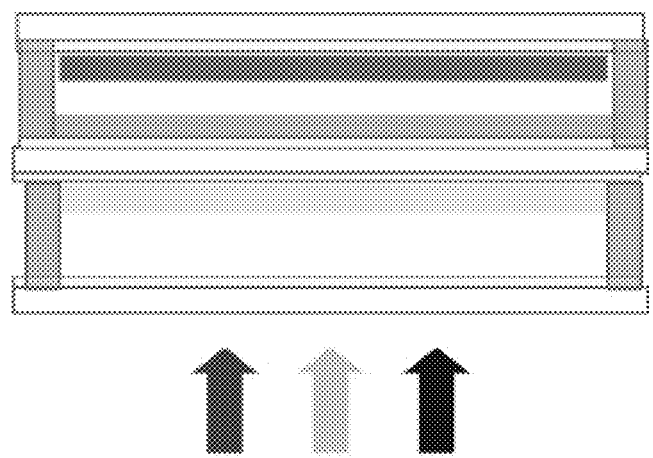
FIG. 12 is a exemplary schematic cross-sectional diagram of an exemplary embodiment of a transmissive color pixel structure of a electrophoretic display device according to the present invention.

Another exemplary embodiment of a color pixel structure of the display device may be a combined structure that can be used in both reflective and transmissive modes. FIG. 11 is a schematic cross-sectional diagram of a combined transmissive/reflective (transflective) structure. Specifically, an insertable and removable reflective panel 1140 is detachably provided under a lower panel 1120, making it possible for the transflective structure to be used in both reflective and transmissive modes. In other words, the color pixel structure can be used in a reflective mode by inserting the reflective panel 1140 and in a transmissive mode by operating a backlight in a state wherein the reflective panel 1140 is withdrawn into a reflective panel holder 1160. In the latter case, it is preferable to position the reflective panel 1140 outside the color pixel. FIG. 12 is a schematic cross-sectional diagram illustrating the use of the color pixel structure in a transmissive mode. Examples of suitable materials for the reflective panel include, but are not limited to, paper, cloth and plastic.

Except for the structural characteristics of the display device, the electrodes and the electrophoretic cells of the display device can be made by suitable known methods.

The low viscosity and dielectric constant of the fluid 330 must be sufficiently low so as not to hinder the migration of the charged particles 340. Transparent solvents and other solutions can be used as the fluid.

According to an exemplary embodiment, the transparent substrates 311 and 321 include, for example, transparent inorganic substrates, such as glass and quartz substrates; and transparent plastic substrates, such as polyethylene terephthalate (PET), polyethylene naphthalate (PEN), polyethylene sulfone (PES), polycarbonate, polystyrene and polypropylene substrates. Flexible substrates are preferred.

According to an exemplary embodiment, any transparent conductive material may be used to form the second electrode 312 and the first electrodes 322 coated on the respective transparent substrates 311 and 321. Specific examples of such transparent conductive materials include, but are not limited to, indium tin oxide (ITO), fluorine-doped tin oxide (FTO), transparent electrode materials such as carbon nanotubes (CNTs), and conductive polymers such as polyacetylene and polythiophene.

While the present invention has been shown and described with reference to some exemplary embodiments thereof, it should be understood by those of ordinary skill in the art that various changes in form and detail may be made therein without departing from the spirit and scope of the present invention as defined by the appending claims.

What is claimed is:

1. An electrophoretic display device comprising:
   unit cells divided by partitions, each of the unit cells comprising:
      an upper panel including a transparent substrate and a second electrode formed over the entire surface of the transparent substrate of the upper panel;
      a lower panel disposed opposite to the upper panel and including a transparent substrate and first electrodes formed at edges of the transparent substrate of the lower panel;
      counter electrodes disposed under respective first electrodes and having a smaller size than the first electrodes;
      a reflective panel positioned under the lower panel; and
      a plurality of charged transmissive colored particles dispersed in a fluid accommodated between the upper and lower panels.

2. The electrophoretic display device of claim 1, wherein each of the unit cells comprises a one-cell two-color type which includes different types of transmissive particles charged with different polarities.

3. The electrophoretic display device of claim 1, wherein the reflective panel is configured to be detachable from the electrophoretic display device.

4. The electrophoretic display device of claim 3, wherein the reflective panel is made of paper, cloth or plastic.

5. The electrophoretic display device of claim 1, wherein the electrophoretic display device is of a transmissive type.

6. The electrophoretic display device of claim 1, wherein the width of the counter electrodes is at least 10 μm smaller than a width of the first electrodes.

7. The electrophoretic display device of claim 1, wherein two unit cells are vertically laminated.

8. The electrophoretic display device of claim 7, wherein the vertically laminated unit cells include two one-cell two-color type unit cells.

9. The electrophoretic display device of claim 7, wherein one of the upper and lower layers of the laminated unit cells is a one-cell one-color type unit cell.

10. The electrophoretic display device of claim 7, wherein the laminated unit cells includes two one-cell one-color type unit cells arranged parallel to each other and one common one-cell one-color unit cell vertically laminated thereon.

11. The electrophoretic display device of claim 7, wherein the laminated unit cells includes two one-cell one-color type unit cells arranged parallel to each other and two one-cell one-color type unit cells vertically laminated on the respective previous unit cells.

12. The electrophoretic display device of claim 1, wherein the electrophoretic display device includes two unit cells including two one-cell two-color type unit cells arranged parallel to each other.

13. The electrophoretic display device of claim 12, wherein one of the two unit cells is of a one-cell one-color type.

14. The electrophoretic display device of claim 1, wherein a color of the transmissive charged particles is selected from cyan, magenta and yellow.

15. The electrophoretic display device of claim 14, wherein the color of the transmissive charged particles is selected from cyan, magenta, yellow, red, green and blue.

16. The electrophoretic display device of claim 8, wherein one of four colors of the two unit cells is black.

17. The electrophoretic display device of claim 12, wherein one of four colors of the two unit cells is black.

18. A method for operating an electrophoretic display device comprising unit cells divided by partitions, each of the unit cells including an upper panel having a transparent substrate and a second electrode formed over the entire surface of the transparent substrate of the upper panel, a lower panel disposed opposite to the upper panel and having a transparent substrate and first electrodes formed at edges of the transparent substrate of the lower panel, counter electrodes disposed under respective first electrodes and having a smaller size than the first electrodes, a reflective panel positioned under the lower panel, and a plurality of charged transmissive colored particles dispersed in a fluid accommodated between the upper and lower panels, the method comprising:

uniformly dispersing the charged transmissive colored particles in the fluid to create a color; and collecting the dispersed transmissive particles on the first electrodes to erase the color.

19. The method of claim 18, wherein the collected transmissive particles are uniformly distributed in the fluid by applying an alternating current or pulsed signals between the first electrodes or between the first and second electrodes.

* * * * *